United States Patent
Tan et al.

(10) Patent No.: US 7,153,587 B2
(45) Date of Patent: Dec. 26, 2006

(54) POLYESTER RESIN AND POLYESTER RESIN LAMINATE CONTAINER

(75) Inventors: Junji Tan, Sodegaura (JP); Yasuhiro Mutou, Sodegaura (JP); Seiji Ota, Sodegaura (JP); Toyoaki Sasaki, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/567,793

(22) PCT Filed: May 31, 2004

(86) PCT No.: PCT/JP2004/007853

§ 371 (c)(1),
(2), (4) Date: Feb. 9, 2006

(87) PCT Pub. No.: WO2005/014694

PCT Pub. Date: Feb. 17, 2005

(65) Prior Publication Data

US 2006/0204771 A1    Sep. 14, 2006

(30) Foreign Application Priority Data

Aug. 12, 2003  (JP) .............................. 2003-292655

(51) Int. Cl.
*B32B 27/36*   (2006.01)
*C08G 63/06*   (2006.01)
*C08G 63/12*   (2006.01)
*C08G 63/16*   (2006.01)
*C08G 63/183*  (2006.01)

(52) U.S. Cl. ...................... 428/480; 528/302; 528/307; 528/308; 528/308.6

(58) Field of Classification Search ............... None
See application file for complete search history.

(56) References Cited

U.S. PATENT DOCUMENTS

| | | | |
|---|---|---|---|
| 3,929,728 A * | 12/1975 | Chimura et al. ............ 528/285 |
| 4,398,017 A | 8/1983 | Go |
| 4,565,851 A | 1/1986 | Barbee |
| 4,729,927 A | 3/1988 | Hirose et al. |
| 5,780,575 A * | 7/1998 | Brink et al. ................ 528/285 |
| 6,673,403 B1 | 1/2004 | Shiiki et al. |
| 2005/0011892 A1 | 1/2005 | Nakajima et al. |
| 2005/0214368 A1 | 9/2005 | Kawakami et al. |

FOREIGN PATENT DOCUMENTS

| | | |
|---|---|---|
| EP | 0 182 378 A2 | 5/1986 |
| JP | 61-179226 A | 8/1986 |
| JP | 63-40444 B2 | 8/1988 |
| JP | 7-21107 | 3/1995 |
| JP | 2564469 B2 | 9/1996 |
| JP | 10-138371 A | 5/1998 |
| JP | 10-337772 A | 12/1998 |
| JP | 2003-136657 A | 5/2003 |

* cited by examiner

*Primary Examiner*—Vivian Chen
(74) *Attorney, Agent, or Firm*—Birch, Stewart, Kolasch & Birch, LLP

(57) ABSTRACT

The present invention provides a polyester resin which comprises (a-1) 45 to 99% by mole of an oxycarboxylic acid unit having 5 carbon atoms or less, (a-2) 0.5 to 27.5% by mole of an aromatic dicarboxylic acid unit, and (a-3) 0.5 to 27.5% by mole of an aliphatic diol unit having 4 carbon atoms or less, and containing (a-1) to (a-3) in a total amount of 95% by mole or greater, wherein the relationship between the content of the oxycarboxylic acid, expressed as M % by mole, and the density $\rho$ ($kg/m^3$) of the polyester resin, satisfies the formula $\rho \geq 1349 + M \times 0.85$.

7 Claims, No Drawings

POLYESTER RESIN AND POLYESTER RESIN LAMINATE CONTAINER

TECHNICAL FIELD

The present invention relates to a polyester resin obtained by copolymerizing an oxycarboxylic acid, an aromatic dicarboxylic acid and an aliphatic diol having 4 carbon atoms or less, thus having a density in a specific range. More particularly, the invention relates to a polyester resin obtained by copolymerizing an oxycarboxylic acid, which comprises glycolic acid as the main component, an aromatic dicarboxylic acid, and an aliphatic diol having 4 carbon atoms or less, thus having a density in a specific range and a high degree of gas barrier property.

The invention further relates to a molded product comprising a laminate having at least two types of resin layers composed of the above-described copolymerized polyester resin and a crystalline polyester different from the former.

BACKGROUND ART

When a polymeric material is used in food packaging or the like, it is desired to use a material having low gas permeability in order to prevent deterioration of the content. Among polyester resins, polyethylene terephthalate has been frequently used as a material for food packaging in various beverage containers and the like, due to the good balance of moldability, mechanical properties and gas barrier property. However, particularly in food packaging where long-term storage stability is required, even the polyethylene terephthalate resin cannot be said to essentially have a sufficient gas barrier property, and thus a variety of gas barrier property modifiers, for polyester resins or polyethylene terephthalate having excellent gas barrier properties have been suggested.

It has been suggested in JP-B No. 63-40444 that a copolymer of isophthalic acid, ethylene glycol and 1,3-bis(2-hydroxyethoxy)benzene is a resin having low carbon dioxide or oxygen permeability, but this feature does not correspond to a sufficient gas barrier performance.

A study has been also conducted on the use of a polyester copolymerized with an oxycarboxylic acid, such as polyglycolic acid. U.S. Pat. No. 4,565,851 discloses improvement in the gas barrier property by blending polyglycolic acid with polyethylene terephthalate. However, since polyethylene terephthalate is poorly miscible with polyglycolic acid, it is difficult to obtain a transparent resin composition, and thus there is a problem that it is difficult to form a packaging material having good external appearance. Further, JP-A No. 10-138371 discloses a multilayer container made of a thermoplastic resin such as polyethylene terephthalate and polyglycolic acid, and JP-A No. 10-337772 discloses a blow molded container made of polyglycolic acid. However, when polyethylene terephthalate and polyglycolic acid are used to form a multilayer molded container, its poor adhesiveness makes it necessary to use an adhesive for the adherence of interfaces in view of practical utility. Also, there is a problem that polyglycolic acid is likely to undergo hydrolysis and thus, is difficult to be used as a practical packaging material. When the polymers are used in multilayer molded bottles, polyglycolic acid is not highly miscible with polyethylene terephthalate, and thus there are problems that it is not easy to recover and recycle the products. There is also a problem that polyglycolic acid is likely to undergo hydrolysis and thus, is difficult to be used as a packaging material for practical use.

JP-A No. 2003-136657 suggests a laminate container including at least a polyglycolic acid layer and a thermoplastic polyester resin layer. However, since polyglycolic acid is not well miscible with polyethylene terephthalate, when the two polymers are used in laminate molded bottles, the transparency is deteriorated. Moreover, when the laminate is reprocessed by molding, the transparency is reduced, and thus there is a problem that it is difficult to recover and recycle the products.

In addition, polyesters resulting from copolymerization of oxycarboxylic acids and aromatic dicarboxylic acids have been suggested in JP No. 2564469, JP-B No. 7-21107, JP-A No. 61-179226 and the like. JP No. 2564469 and JP-B No. 7-21107 describe the use of a polyethylene terephthalate component and an aliphatic oxycarboxylic acid copolymerized-polyethylene isophthalate component by subjecting the components to multilayer structuring or blending. But, this polyethylene isophthalate containing oxycarboxylic acid does not contain the oxycarboxylic acid in a sufficiently large amount and thus, has insufficient gas barrier property. Furthermore, JP-A No. 61-179226 suggests a copolymer of isophthalic acid and oxycarboxylic acid. However, this copolymer is produced at a high temperature of 260° C. or higher, resulting in a copolymer having low density, and this copolymer cannot be said to have sufficient gas barrier property.

DISCLOSURE OF THE INVENTION

In order to improve the circumstances as described above, the present invention suggests a polyester resin which is obtained by copolymerizing an oxycarboxylic acid of high concentration with an aromatic dicarboxylic acid, which thus has a density in a specific range, high gas barrier property, and practically problem-free resistance to hydrolysis, and which can be recovered and recycled without any inconvenience even when used as a packaging material together with polyethylene terephthalate.

Furthermore, it is an object of the invention to provide a polyester resin laminate molded product which has excellent transparency and interlayer adhesiveness, and thus has unimpaired transparency even upon recycling.

A first embodiment of the invention relates to a copolymerized polyester resin (A) containing 45 to 99% by mole of an oxycarboxylic acid unit having 5 carbon atoms or less based on 100% by mole of the total constituent units of the polyester resin, and containing the oxycarboxylic acid unit having 5 carbon atoms or less, an aromatic dicarboxylic acid unit and an aliphatic diol unit having 4 carbon atoms or less in a total amount of 95% by mole or more, wherein the relationship between the content of the oxycarboxylic acid unit, expressed as M % by mole, and the density of the polyester resin, expressed as $\rho$ (kg/m$^3$), satisfies the formula: $\rho \geq 1349 + M \times 0.85$.

Further, a preferred embodiment of the polyester resin (A) of the invention is preferably such that the relationship between the content of the oxycarboxylic acid unit, expressed as M % by mole, and the carbon dioxide permeability coefficient, expressed as PCO$_2$ (ml·mm/m$^2$·day·atm), satisfies the formula: $PCO_2 \leq 2.7 - M \times 0.023$. In particular, the oxycarboxylic acid unit having 5 carbon atoms or less in the polyester is preferably glycolic acid unit. Further, the aromatic dicarboxylic acid unit in the polyester of the invention is preferably an isophthalic acid unit and/or a 2,6-naphthalenedicarboxylic acid unit and/or a terephthalic acid unit, and among these, the isophthalic acid unit is particularly preferred.

The polyester resin (A) of the invention is preferably prepared by esterification of an oxycarboxylic acid having 5 carbon atoms or less, an aromatic dicarboxylic acid and an aliphatic diol having 4 carbon atoms or less, and further melt polycondensation of the resulting product at a temperature in the range of 150° C. to 250° C.

Furthermore, the polyester resin of the invention is preferably prepared by transesterification of an oxycarboxylic acid ester having 5 carbon atoms or less, an aromatic dicarboxylic acid ester and an aliphatic diol having 4 carbon atoms or less, and further, melt polycondensation of the resulting product at a temperature in the range of 150° C. to 250° C.

A second embodiment of the invention is a polyester resin molded product formed from a laminate having at least two types of layers comprising the above-mentioned copolymerized polyester resin (A) and a crystalline polyester resin (B) different from that resin.

The crystalline polyester resin (B) of the invention is, inter alia, preferably polyethylene terephthalate, polytrimethylene terephthalate, polybutylene terephthalate, polyethylene-2,6-naphthalate, or polyethylene isophthalate.

The crystalline polyester resin of the invention refers to a resin whose melting peak is observed by DSC (differential scanning calorimetry).

The polyester resin molded product of the invention preferably has a laminate structure having at least a layer comprising the copolymerized polyester resin (A) and a layer comprising the crystalline polyester resin (B), wherein at least one side of the layer comprising the copolymerized polyester resin (A) is preferably in contact with the layer comprising the crystalline polyester resin (B), and particularly the molded product preferably has a laminate structure in which the layer of (A) is interposed between the layers of (B).

BEST MODE FOR CARRYING OUT THE INVENTION

[Polyester Resin (A)]

The polyester resin (A) of the present invention is a polyester resin containing 45 to 99% by mole of an oxycarboxylic acid unit having 5 carbon atoms or less based on 100% by mole of the total constituent units of the polyester resin, and containing the oxycarboxylic acid unit having 5 carbon atoms or less, an aromatic dicarboxylic acid unit and an aliphatic diol unit having 4 carbon atoms or less in a total amount of 95% by mole or more, wherein the relationship between the content of the oxycarboxylic acid unit, expressed as M % by mole, and the density of the polyester resin, expressed as $\rho$ (kg/m$^3$), satisfies the formula: $\rho \geq 1349 + M \times 0.85$. The aromatic dicarboxylic acid unit and the aliphatic diol unit having 4 carbon atoms or less are usually contained in an amount of 0.5 to 27.5% by mole, preferably 1 to 20% by mole, and more preferably 1 to 15% by mole, based on 100% by mole of the total constituent units of the polyester resin (A).

Examples of the oxycarboxylic acid having 5 carbon atoms or less as used herein include glycolic acid, lactic acid, 4-hydroxy-n-butyric acid, 2-hydroxyisobutyric acid, 5-hydroxy-n-valeric acid, 3-hydroxypropionic acid and the like. These may be used individually or in combination of two or more species.

Among these oxycarboxylic acids, glycolic acid, 3-hydroxycarboxylic acids and the like are preferred, and glycolic acid is more preferred, in view of obtaining a polyester resin having high gas barrier property. These oxycarboxylic acids are usually contained in an amount of 45 to 99% by mole, preferably 50 to 98% by mole, and more preferably 60 to 97% by mole, based on 100% by mole of the total constituent units of the polyester resin.

The aromatic dicarboxylic acid to be used for the invention may be exemplified by aromatic dicarboxylic acid having 8 to 12 carbon atoms. Specifically, mention may be made of isophthalic acid, terephthalic acid, phthalic acid, 2,6-naphthalenedicarboxylic acid or the like. These aromatic dicarboxylic acids may be used individually or in combination of two or more species. Among these aromatic dicarboxylic acids, at least one selected from isophthalic acid, 2,6-naphthalenedicarboxylic acid and terephthalic acid is preferred in view of obtaining a polyester having excellent gas barrier property and mechanical properties. In particular, it is preferable to use isophthalic acid.

The aliphatic diol having 4 carbon atoms or less to be used for the invention may be exemplified by ethylene glycol, diethylene glycol, 1,2-propanediol, 1,3-propanediol, 1,4-butanediol or the like. These aliphatic diols may be used individually or in combination of two or more species. Among these, ethylene glycol is preferred.

The polyester resin molded product which is laminated with the layer comprising the crystalline polyester resin (B) employs ethylene glycol as the aliphatic diol having 4 carbon atoms or less. The aromatic dicarboxylic acid and ethylene glycol are usually contained in an amount of 0.5 to 27.5% by mole, preferably 1 to 20% by mole, and more preferably 1 to 15% by mole, based on 100% by mole of the total constituent units of the polyester resin (A).

The polyester resin (A) of the invention contains the above-described oxycarboxylic acid unit, aromatic dicarboxylic acid unit and aliphatic diol unit having 4 carbon atoms or less, usually in a total amount of 95% by mole or more, preferably 97% by mole or more, and more preferably 99% by mole or more. By copolymerizing the oxycarboxylic acid, the aromatic dicarboxylic acid and the aliphatic diol having 4 carbon atoms or less in an amount within the above-described range, a polyester resin having a high degree of gas barrier property, practical resistance to hydrolysis, high miscibility and adhesiveness with other polyester resins, particularly with polyethylene terephthalate, can be provided, which is desirable. Further, the polyester resin is also desirable from the viewpoint that when the laminate is reprocessed by molding, the decrease in transparency is less and recyclability is excellent.

The polyester resin of the invention may also contain monomers listed below in addition to the oxycarboxylic acid, aromatic dicarboxylic acid and aliphatic diol having 4 carbon atoms or less, as long as the composition does not go beyond the range. Examples of the dicarboxylic acid which may be contained include, specifically, aliphatic dicarboxylic acids such as oxalic acid, malonic acid, succinic acid, fumaric acid, maleic acid, glutaric acid, adipic acid, sebacic acid, azelaic acid and decanedicarboxylic acid; and alicyclic dicarboxylic acids such as cyclohexanedicarboxylic acid. Examples of the diol which may be contained include, specifically, aliphatic diols such as 1,6-hexanediol, neopentyl glycol, dodecamethylene glycol, triethylene glycol and tetraethylene glycol, alicyclic diols such as cyclohexanedimethanol and isosorbide; and aromatic group-containing diols such as 1,3-bis(2-hydroxyethoxy)benzene, 1,2-bis(2-hydroxyethoxy)benzene, 1,4-bis(2-hydroxyethoxy) benzene, bis[4-(2-hydroxyethoxy)phenyl]sulfone, 2,2-bis(4-β-hydroxyethoxyphenyl)propane, bisphenols, hydroquinone and resorcin.

The polyester resin (A) used in the invention may contain, if necessary, 0.001 to 2% by mole, and more preferably 0.01 to 0.4% by mole, of a monomer unit having a functionality of 3 or greater which is capable of ester formation. Examples of the monomer unit having a functionality of 3 or greater include polyfunctional carboxylic acids having 3 or more carboxyl groups, the units derived from polyfunctional alcohols having 3 or more hydroxyl groups, and polyfunctional hydroxy acids having 3 or more carboxyl groups and hydroxyl groups. Among these, the polyester resins containing the units derived from polyfunctional alcohols having 3 or more hydroxyl groups are particularly preferred. Specifically, the units derived from glycerin, diglycerin, (trishydroxymethyl)methane, 1,1,1-(trishydroxymethyl)ethane, 1,1,1-(trishydroxymethyl) propane, pentaerythritol, dipentaerythritol, saccharides such as sorbitol, glucose, lactose, galactose, fructose and saccharose, and nitrogen-containing polyvalent alcohols such as 1,3,5-trishydroxyethoxyisocyanurate, are exemplified. Among these, those selected from glycerin, 1,1,1-(trishydroxymethyl)ethane, 1,1,1-(trishydroxymethyl)propane, pentaerythritol and dipentaerythritol are preferred.

The polyester resin of the invention is characterized in that the relationship between the content of the oxycarboxylic acid, expressed as M % by mole, and the density of the polyester resin, expressed as $\rho$ (kg/m$^3$), satisfies the formula: $\rho \geq 1349+M\times0.85$. The polyester conforming to such relationship is excellent in the balance between the gas barrier property and the mechanical properties and thus, is particularly suitable when used as a packaging material such as bottles and films. Here, the density $\rho$ is a value measured after drying pellets obtained by quenching a molten polyester resin in ice water, under reduced pressure at room temperature for 24 hours, using a density gradient column by means of a tetrachlorocarbon-heptane solution at 23° C.; while M is a value determined by measuring a 400 MHz proton nuclear magnetic resonance spectrum in a deuterated chloroform solution.

For example, in the case of polyester comprising units from glycolic acid (GA), isophthalic acid (IA) and ethylene glycol (EG), the signals observed are roughly classified into (1) the signal attributable to the methylene adjacent to the ether oxygen of the diethylene glycol unit (DEG), which is a side product, (2) the overlapping signals attributable to methylene of the GA unit, methylene of the EG unit, and methylene that is not adjacent to the ether oxygen of the DEG unit, and (3) the signal attributable to ring protons of the IA unit. Using the intensity ratios of these three signals, the proportion of each monomer unit is determined.

First, taking the number of functionalities at the terminals into account, the number of the carboxylic acid units derived from IA can be assumed to be equal to the total number of the hydroxyl units derived from EG and DEG. Here, the number of the EG units can be said to be the difference between the number of the IA units determined from signal (3) and the number of the DEG units determined from signal (1). Next, since the integrated intensity of signal (2) originates from the GA units, the EG units and the DEG units, the number of the GA units can be determined by subtracting the integrated intensity attributable to the EG units and DEG units from the integrated intensity of signal (2). Thereby, the respective proportion of the GA, IA, EG and DEG units can be determined.

The polyester resin (A) of the invention is preferably such that the relationship between the content of the oxycarboxylic acid unit, expressed as M % by mole, and the carbon dioxide permeability coefficient, expressed as PCO$_2$ (ml·mm/m$^2$·day·atm) satisfies the formula: $PCO_2 \leq 2.7-M\times0.023$. Here, the carbon dioxide permeability coefficient is a value measured at 25° C. using a GPM-250 apparatus manufactured by GL Sciences, Inc. after molding a polyester resin into a press film.

The polyester resin (A) of the invention preferably has low crystallinity and a cold crystallization temperature of 100° C. or higher, or is non-crystalline and substantially amorphous, in view of obtaining molded articles with excellent transparency.

The crystallinity as used herein can be evaluated on the basis of the size of the melting peak observed when a polyester resin that has been stored dry at room temperature for one day or longer, preferably 14 days or longer, is subjected to DSC whereby the polyester resin is cooled to a temperature below the glass transition temperature at a rate of −50° C./min or greater, and preferably −100° C./min or greater, maintained at the temperature for 5 to 15 minutes, and then heated again to a temperature capable of processing by melt forming, and preferably to a temperature of 230° C. or higher, at a rate of 10° C./min. The polyester resin of the invention preferably has a melting peak of 70 J/g or less in size, and more preferably 50 J/g or less in size. The term, cold crystallization temperature refers to the temperature for an exothermic peak observed in a temperature region between the glass transition temperature and the melting temperature, when measurement by DSC is carried out under the above-described conditions, and this peak temperature is preferably 100° C. or higher, and more preferably 110° C. or higher.

In addition, the term substantially amorphous refers to a state such that when measurement by DSC is carried out under the above-described conditions, any peaks of 0.5 J/g or more cannot be observed other than change in heat capacity by glass transition.

The polyester resin (A) of the invention has a reduced viscosity (IV: unit [dl/g]) of usually 0.3 to 2.5, preferably 0.4 to 2.0, and more preferably 0.5 to 1.5.

The glass transition temperature of the polyester resin is usually 20° C. to 90° C., preferably 25° C. to 80° C., and more preferably 30° C. to 70° C.

[Method for Preparation of Polyester Resin (A)]

The polyester resin of the invention can be prepared by any one of methods, including a method for esterifying the above-described oxycarboxylic acid, aromatic dicarboxylic acid and aliphatic diol having 4 carbon atoms or less, and then melt polycondensing the resulting product at a temperature in the range of 150° C. to 250° C.; a method for transesterifying an oxycarboxylic acid ester, an aromatic dicarboxylic acid ester and an aliphatic diol having 4 carbon atoms or less and then melt polycondensing the resulting product at a temperature in the range of 150° C. to 250° C. As such, when melt polycondensation is carried out at a temperature in the range of 150° C. to 250° C., and preferably at a low temperature of 190° C. to 230° C. or lower, only a small amount of oligomers are distilled out, and therefore polymerization can be carried out efficiently, yielding a polyester resin having sufficiently high molecular weight. As a result, a polyester resin having a high density satisfying Formula 1, and the resin has excellent gas barrier property, mechanical strength and color, which is desirable.

According to the invention, as a method for esterification of an oxycarboxylic acid, an aromatic dicarboxylic acid and an aliphatic diol having 4 carbon atoms or less, mention may be made of a method wherein a predetermined oxycarboxylic acid, aromatic dicarboxylic acid and aliphatic diol having 4 carbon atoms or less are simultaneously or gradually subjected to direct esterification, preferably at a temperature of 130 to 220° C. and under pressure or ordinary pressure. Further, the oxycarboxylic acid as used herein may be any of monomeric oxycarboxylic acids, cyclic monomers of oxycarboxylic acid, cyclic oligomers or chained oligomers. Specific examples of the oligomer include glycolides, lactides and various lactones.

When the above-described reaction is carried out, it is preferable to take the diol starting compound at a ratio of 1.01 to 3.5 moles, and preferably 1.1 to 3.0 moles, and the oxycarboxylic acid starting compound at a ratio of 1.35 moles to 18 moles, preferably 2 moles to 18 moles, and more preferably 3 moles to 18 moles, based on 1 mole in total of the dicarboxylic acid starting compound. The above-described esterification reaction may be carried out in complete absence of catalyst, or in the presence of a catalyst includes an acid, such as concentrated sulfuric acid or p-toluenesulfonic acid; and a metal complex or the like. However, it is preferable to carry out the reaction without catalyst.

According to the invention, as a method for transesterification of an oxycarboxylic acid ester, an aromatic dicarboxylic acid ester and an aliphatic diol having 4 carbon atoms or less, mention may be made of a method wherein predetermined amounts of the oxycarboxylic 5 acid ester, the aromatic dicarboxylic acid ester and the aliphatic diol having 4 carbon atoms or less are transesterified at a temperature of 130 to 220° C. and at ordinary pressure, with lower monoalcohols being distilled out.

The above-described reaction is preferably carried out with the diol starting compound at a ratio of 1.01 to 4 moles, and preferably 1.2 to 3.2 moles, the oxycarboxylic acid ester starting compound at a ratio of 1.35 moles to 18 moles, preferably 2 moles to 18 moles, and more preferably 3 moles to 18 moles, based on 1 mole in total of the dicarboxylic acid starting compound. The above-described transesterification reaction is usually carried out in the presence of various metal complexes such as manganese acetate or zinc acetate.

Subsequently, the low polymer obtained by the methods as described above can be subjected to melt polycondensation in the presence of a polymerization catalyst and a stabilizer at a temperature in the range of 150° C. to 250° C., and preferably in the range of 190 to 230° C. and under a reduced pressure condition of 10 Torr or lower, and preferably 2 Torr or lower, with stirring, for 1 hour to 24 hours, and preferably 2 hours to 12 hours, with a component containing diols such as ethylene glycol as a main component being distilled out, in order to prepare a predetermined polyester resin.

Furthermore, as the polymerization catalyst can be used herein includes organic complexes, oxides or elemental forms of metals, for example, alkali metals such as sodium, alkaline earth metals such as magnesium, or aluminum, zinc, tin, titanium, copper, nickel, cobalt, zirconium, germanium, iron, antimony and vanadium. In particular, organic complexes or oxides of transition metals such as zinc, tin, titanium, cobalt, germanium or antimony are preferred, and germanium dioxide is particularly preferred.

Furthermore, these reactions may be carried out in the presence of various stabilizers or anti-coloring agents. Examples of the stabilizer or anti-coloring agent include phosphorus compounds, hindered phenol compounds and the like. Among these, those containing phosphorus compounds are particularly preferred. The phosphorus compound may be exemplified by inorganic phosphorus compounds such as phosphoric acid, phosphorous acid or polyphosphoric acid; phosphoric acid ester compounds such as trimethyl phosphate or diphenyl phosphate; phosphorous acid ester compounds such as triphenylphosphite or tris(2,4-di-t-butylphenyl)phosphite; or the like.

[Use of Polyester Resin (A)]

The polyester resin (A) of the invention can be used in a non-stretched state as a material for molded products imparted with various shapes by conventional molding techniques, such as films, sheets, blow molded containers and the like. Furthermore, molded products having even more excellent gas barrier property can be obtained by molding the polyester resin in a stretched state into films, sheets or blow molded containers.

The polyester resin of the invention may be mixed with, if necessary, an appropriate amount of a heat resistant stabilizer, a weather resistant stabilizer, a UV absorbent, a nucleating agent, an inorganic filler, a lubricant, a slip agent, an anti-blocking agent, an antistatic agent, an anti-fogging agent, a pigment, an oxygen absorbent, a hydrolysis inhibiting agent, an end capping agent, a hydrochloric acid absorbent or the like which are incorporated in conventional polyesters.

Among these, when a heat resistant stabilizer, an anti-coloring agent, a hydrolysis inhibiting agent or a hydrochloric acid absorbent is contained, the polyester resin has improved heat resistant stability and resistance to hydrolysis, which is preferable.

Among the heat resistant stabilizers, phosphorus compounds are particularly preferred. Examples of the phosphorus compound include inorganic phosphorus compounds such as phosphoric acid, phosphorous acid and polyphosphoric acid; phosphoric acid ester compounds such as trimethyl phosphate and diphenyl phosphate; phosphorous acid ester compounds such as triphenyl phosphite and tris (2,4-di-t-butylphenyl) phosphite; and the like. The hydrolysis inhibiting agent may be exemplified by a carbodiimide compound or an oxazoline compound. Among these, polycarbodiimide (for example, product name: Carbodilite®; Nisshinbo Industries, Inc.), bisoxazoline, 1,3-bis(4,5-dihydro-2-oxazolyl)benzene, and 1,4-bis(4,5-dihydro-2-oxazolyl)benzene may be particularly exemplified. The hydrochloric acid absorbent may be exemplified by fatty acid metal salts such as calcium stearate or zinc stearate, hydrotalcite or epoxy resins (for example, product name: Celloxide 2021, manufactured by Daicel Chemical Industries, Ltd.).

The polyester resin (A) of the invention may be blended with other resins to be used as a gas barrier property modifier for the other resins. The types of the other resins to which the polyester resin of the invention is added may include polyolefin resins such as polyethylene, polypropylene, and cyclic polyolefins, and resins such as polyester resins and polyamide resins. Among these, polyester resins are preferred from the viewpoint of being homogeneously miscible. Examples of the polyester resin to which the polyester resin of the invention is added may include, specifically, aromatic polyesters such as polyethylene terephthalate, polytrimethylene terephthalate, polybutylene terephthalate, polyhexamethylene terephthalate, polyethylene 2,6-naphthalate, polytrimethylene 2,6-naphthalate, polybutylene 2,6-naphthalate, polyhexamethylene 2,6-naphthalate, polyethylene isophthalate, polytrimethylene isophthalate, polybutylene isophthalate, polyhexamethylene isophthalate, and poly-1,4-cyclohexanedimethanol terephthalate; and aliphatic polyesters such as polylactic acid, polycaprolactone, polybutylene succinate, polyethylene adipate, and polybutylene adipate. Among these, polyethylene terephthalate, polytrimethylene terephthalate, polybutylene terephthalate, and polyethylene 2,6-naphthalate are preferred, and polyethylene terephthalate is more preferred.

The polyester resin (A) of the invention is preferably added to other polyester resins as described above by melt blending. Alternatively, solid phase polymerization may be further carried out after the melt blending. The temperature at which melt blending is carried out can be any temperature as long as it is a temperature not less than the flow temperatures of the polyester resin of the invention and the other polyester resin, but the temperature is preferably in the range of 180 to 300° C., and preferably in the range of 220 to 290° C. The time required to carry out melt blending is preferably in the range of 30 seconds to 4 hours, and more preferably in the range of 1 minute to 2 hours.

The apparatus for carrying out melt blending may be exemplified by a single screw extruder, a twin screw extruder, a plastmill, a kneader, various extrusion molding machines or injection molding machines, or a reactor equipped with a stirring device or a pressure reducing device, or the like. This melt blending is preferably carried out under an inert gas atmosphere and/or under reduced pressure.

In addition, the polyester resin composition obtained by the melt blending may be further subjected to solid phase polymerization after being maintained at a temperature not more than the melting point, under reduced pressure or under an inert gas stream, for 20 minutes to 100 hours. The solid phase polymerization can be carried out by employing a known method, and for example, solid phase polymerization can be carried out by maintaining the pellets of the polyester resin composition under an inert gas atmosphere at a temperature in the range of 80° C. to a temperature of 30° C. below the melting peak temperature for 1 to 300 minutes to achieve precrystallization, and then maintaining the pellets again at a temperature in the range of 130° C. to a temperature of 10° C. below the melting peak temperature for 1 to 100 hours. The resin resulting from the solid phase polymerization attains increased molecular weight, and thus attains improved mechanical strength and reduced contents of low molecular weight components, which is desirable.

The resin composition thus obtained can be used in a non-stretched state as a material for molded products imparted with various shapes by conventional molding techniques, such as films, sheets, blow molded containers and the like. Furthermore, molded products having even more excellent gas barrier property can be obtained by molding the resin composition in a stretched state into films, sheets or blow molded containers.

The polyester resin (A) of the invention may be used individually, or can be also prepared and used in the form of being laminated with other resins. With regard to the molded products, the laminate can be applied to sheets, plate-shaped products and tube-shaped products, as well as molded products having various shapes such as hollow products or containers. The laminate molded products can be produced according to conventional known methods.

Examples of the other resin used for laminating with the polyester resin (A) of the invention include polyolefin resins such as polyethylene, polypropylene and cyclic polyolefins, and resins such as polyester resins and polyamide resins. Among these, polyester resins are preferred because they have good interface stability and do not need the use of special adhesives. Moreover, these polyester resins to be laminated are preferably crystalline polyesters. Hereinafter, crystalline polyesters will be described.

[Crystalline Polyester Resin (B)]

The crystalline polyester resin (B) of the invention may be exemplified by, specifically, aromatic crystalline polyesters such as polyethylene terephthalate, polytrimethylene terephthalate, polybutylene terephthalate, polyhexamethylene terephthalate, polyethylene 2,6-naphthalate, polytrimethylene 2,6-naphthalate, polybutylene 2,6-naphthalate, polyhexamethylene 2,6-naphthalate, polyethylene isophthalate, polytrimethylene isophthalate, polybutylene isophthalate, polyhexamethylene isophthalate, and poly-1,4-cyclohexanedimethanol terephthalate; aliphatic crystalline polyesters such as polylactic acid, polycaprolactone, polyethylene succinate, polybutylene succinate, polyethylene adipate, and polybutylene adipate; and semi-aromatic crystalline polyesters such as polyethylene terephthalate-adipate, polyethylene terephthalate-succinate, and polybutylene terephthalate-adipate.

Among these, crystalline polyester resins such as polyethylene terephthalate, polytrimethylene terephthalate, polybutylene terephthalate, polyethylene 2,6-naphthalate, and polyethylene isophthalate are particularly preferred. Especially, polyethylene terephthalate is preferred.

The polyester resin may contain a monomer unit other than the dicarboxylic acid and diol units, the main components, in an amount of 20% by mole or less based on 100% by mole of the total monomer units.

Dicarboxylic acids which may be contained: aromatic dicarboxylic acids such as phthalic acid, isophthalic acid, 2,6-naphthalenedicarboxylic acid, 2,7-naphthalenedicarboxylic acid, 1,4-naphthalenedicarboxylic acid, 4,4'-sulfonebisbenzoic acid, 4,4'-biphenyldicarboxylic acid, 4,4'-sulfidobisbenzoic acid, 4,4'-oxybisbenzoic acid, and diphenoxyethanedicarboxylic acid; aliphatic dicarboxylic acids such as malonic acid, succinic acid, glutaric acid, fumaric acid, maleic acid, adipic acid, sebacic acid, azelaic acid, and decanedicarboxylic acid; alicyclic dicarboxylic acids such as cyclohexanedicarboxylic acid.

Diols which may be contained: aliphatic diols such as diethylene glycol, 1,2-propanediol, 1,3-propanediol, 1,4-butanediol, 1,6-hexanediol, neopentyl glycol, dodecamethylene glycol, triethylene glycol, and tetraethylene glycol; alicyclic diols such as cyclohexanedimethanol; diols containing aromatic groups such as 1,3-bis(2-hydroxyethoxy)benzene, 1,2-bis(2-hydroxyethoxy)benzene, 1,4-bis(2-hydroxyethoxy)benzene, bis[4-(2-hydroxyethoxy)phenyl]sulfone, 2,2-bis(4-β-hydroxyethoxyphenyl)propane, bisphenols, hydroquinone, and resorcin.

Hydroxycarboxylic acids which may be contained: glucolic acid, diglucolic acid, lactic acid, 3-hydroxybutyric acid, p-hydroxybenzoic acid, m-hydroxybenzoic acid, p-hydroxymethylbenzoic acid, m-hydroxymethylbenzoic acid, p-(2-hydroxyethyl)benzoic acid, and m-(2-hydroxyethyl)benzoic acid.

The crystallinity is determined on the basis of whether a melting peak is observed by DSC (differential scanning calorimetry) or not. Here, the melting peak in DSC can be obtained by making measurement in a process of melting the resin composition once to a temperature capable of processing by melt forming, then solidifying by quenching to room temperature at a cooling rate of about −300° C./min, and then heating again to the melting temperature at an elevating rate of 10° C./min, all under a nitrogen or helium stream at ordinary pressure. The melting peak temperature is preferably in the range of 50 to 300° C. Furthermore, the heat of fusion is determined from the area of the measured peak, and the heat of fusion, ΔHfb, is preferably 1 (J/g) or greater, and more preferably 10 (J/g) or greater.

[Molded Products Comprising Polyester Resins (A) and (B)]

In the case where the polyester resin packaging material of the invention is formed in a laminate structure, there is no limitation on the formation of layers, and there is no limitation particularly on the number of layers. However, the packaging material for practical purposes may have a constitution of up to 5 layers, and preferably up to 3 layers.

It is preferable that at least one side of the layer of copolymerized polyester (A) is in contact with the layer of polyester resin (B), in view of adhesiveness.

Furthermore, in general, the layer of polyester resin (B) preferably forms the innermost layer of the packaging material, and in the case of a three-layered structure, it is favorable that the layer of the oxycarboxylic acid-copolymerized polyester (A) forms the middle layer. In particular, when the oxycarboxylic acid-copolymerized polyester (A) is more likely to undergo hydrolysis than the crystalline polyester resin (B), the layer of (A) preferably forms the middle layer which is not put in direct contact with moisture.

The packaging material of the invention may be exemplified by containers that are obtained by those molding methods involving drawing, such as bottles and cups. Mention may be also made of containers that are obtained by molding unstretched sheets by deep drawing, and containers that are obtained by subjecting pipes to bottom formation and drawing. Further, sheets, or tray-shaped containers obtained by vacuum or pneumatic molding of the sheets are also included. For the methods of obtaining these packaging materials, in the case of bottles for example, mention may be made of conventionally known extrusion blow molding methods, or a biaxial stretching blow molding method. However, from the perspectives of the mechanical properties and thermal properties of bottles or productivity, the biaxial stretching blow molding method is advantageous. In the case of the biaxial stretching blow molding method, an expandable, geometrically shaped product, that is, a precursory molded product for a container is heated to the drawing temperature and then drawn in a blow mold by means of drawing rods that are moving in the axial direction and blown in compressed gas, or a precursory molded product for pipe that is moving in the axial direction is heated to the drawing temperature, subjected to bottom formation after drawing by means of the difference between the convey rate and the uptake rate, and then drawn in the peripheral direction by blowing a compressed gas in, so that the shape of bottle can be rendered.

A precursory molded product for a container having a laminate structure can be obtained by molding stepwise sequentially from the inner layers using a conventional injection molding machine or a molding machine having plural melting-injection molding device, for example, or by injecting out layers of molten oxycarboxylic acid-copolymerized polyester (A) and layers of polyester resin (B), continuously and alternately with shifted timing, or almost simultaneously, using a molding machine having plural injection cylinders, in a single mold and in a single clamping operation, in order to render the layers of polyester resin (B) that have been injected out first to form inner and outer surface layers and to render the layers of polyester resin (A) that have been injected out later to form middle layers; or alternatively, by subjecting one end of a laminate pipe formed by a laminate extruding machine to bottom formation; or the like. In the case of injection molding, the temperature of the injection cylinder is 190° C. to 300° C., preferably 200° C. to 230° C., for the oxycarboxylic acid-copolymerized polyester (A). With regard to the polyester resin (B), the temperature may vary depending on the resin composition, but it is preferably 260° C. to 300° C. in the case of polyethylene terephthalate.

Next, heating of a precursory molded product for a container or a precursory molded product for laminate pipe can be usually carried out in a typical heating oven having a heat-generating element, such as a typical block heater or infrared heater. In the case of the precursory molded product for a laminate container, the drawing temperature is almost equal to the drawing temperature for the precursory molded product for a container composed of polyester resin (B) only. For example, when polyethylene terephthalate is used as the polyester resin (B), the drawing temperature for the biaxial stretching blow molding is 90° C. to 140° C., and preferably 100° C. to 120° C.

EXAMPLES

Hereinafter, the invention will be described in detail with reference to Examples.

(1) Density: The density of polyester resin was measured by the density gradient column method (23° C.).

(2) Reduced viscosity: The reduced viscosity, IV, of polyester resin was measured in a mixed solution of phenol and tetrachloroethane (weight ratio=1/1) at 25° C.

(3) Composition: The composition of polyester resin was determined by measuring the 400 MHz proton nuclear magnetic resonance spectrum of a deuterated chloroform solution of the resin. For example, in Example 1, the assignment of the individual signals is as follows, and the composition was calculated from the integrated intensity ratios.

$\delta$ 3.5–4.0 ppm (1.02 H, methylene adjacent to the ether oxygen of the diethylene glycol unit), $\delta$ 4.1–5.1 ppm (13.88 H, methylene of the glycolic acid unit, methylene of the ethylene glycol unit, and methylene that is not adjacent to the ether oxygen of the diethylene glycol unit), $\delta$ 7.4–8.8 ppm (4.0 H, ring proton of the isophthalic acid unit)

DEG=1.02/4=0.255 unit
IA=4.0/4=1.0 unit
EG=IA−DEG=1.0−0.255=0.745 unit
GA=(13.88−4EG−4DEG)/2=(13.88−2.98−1.02)/2=4.94 units Therefore, the composition is such that GA/IA/EG/DEG=4.94/1.0/0.745/0.255 (unit)=71.2/14.4/10.7/3.7 (% by mole).

(4) Glass transition temperature: The glass transition temperature of polyester resin was measured using a differential scanning calorimeter, SSC5200H type (Seiko Instruments Inc.). A 10 mg sample of a resin thoroughly dried beforehand was weighed on a sample pan and was subjected to a procedure of heating from room temperature to 200° C. (rate of temperature elevation: 100° C./min), maintaining at 200° C. for 5 minutes, subsequently quenching down to −50° C. (rate of temperature lowering: 100° C./min), maintaining at −50° C. for 10 minutes, and then heating to 200° C. (rate of temperature elevation=10° C./min), wherein the measurement was made in a nitrogen atmosphere. The glass transition temperature, heat of fusion at the melting point and the cold crystallization temperature were determined by using the analysis software included in the system.

(5) Gas barrier property: For the gas barrier property of a press film of polyester resin, the carbon dioxide permeability coefficient was measured using a GPM-250 apparatus available from GL Sciences, Inc., and the oxygen permeability coefficient was measured using an Oxtran apparatus available from Mocon, Inc., at 25° C. in both cases.

(6) Transparency: The transparency of polyester resin was determined from the value of a press film using a hazemeter (Nippon Denko Co., Ltd.).

(7) Resistance to hydrolysis: The resistance to hydrolysis of polyester resin was evaluated by the following grades, after storing a film at 23° C. and at a relative humidity of 50% for 2 months and observing the state change of the film:
O: No change x: Film strength is markedly lowered

Example 1

100 parts by weight of glycolic acid, 29.7 parts by weight of isophthalic acid, 38.9 parts by weight of ethylene glycol and 0.08 parts by weight of trimethylolethane were introduced to a reaction tank, an esterification reaction was carried out under a nitrogen atmosphere at ordinary pressure and at 130 to 200° C. with stirring, while distilling off any generated water, for 24 hours until the reaction mixture became transparent.

The resulting polyester oligomer was introduced into a reactor made of glass and equipped with a stirring device and a distillation pipe. The distillation pipe has a structure which is connected to a vacuum facility comprising a vacuum pump and a vacuum regulator and is capable of distilling out an evaporant. 0.6 parts by weight of a germanium-based catalyst (containing 6.7% by weight of germanium dioxide) was added to the reactor. The reaction was carried out first under a nitrogen stream at 200° C. for about 30 minutes with stirring, subsequently the pressure of the system was reduced to about 0.8 Torr within about one hour while maintaining the system at 200° C., and then the reaction was carried out under the condition of about 0.8 to 0.5 Torr in about 10 hours, while elevating the temperature to 225° C. with stirring, to distill off any generated ethylene glycol from the system. During this polycondensation reaction, the viscosity of the product increased over time.

The density of the polyester resin obtained by this reaction was 1426 kg/m$^3$. The reduced viscosity IV was 0.635 dl/g. The compositions of the respective component units of glycolic acid, isophthalic acid, ethylene glycol and diethylene glycol in this polycondensation product were 71.0% by mole, 14.5% by mole, 10.1% by mole and 4.4% by mole, respectively. The polyester resin was amorphous, and the glass transition temperature was 41.0° C.

A press film having a thickness of about 70 µm was produced by drying this polyester resin under reduced pressure at about 40° C. for about 20 hours, subsequently inserting a predetermined amount of the dried polyester resin between two sheets of brass plates, aluminum plates and release films, melting at 200° C., pressing at 10 MPa for 1 minute, and then cold pressing again at 10 MPa with a compression molding machine set at a temperature of 20° C. The obtained film was used to measure the gas barrier property, and as a result, the carbon dioxide permeability coefficient was 0.85 cm$^3$·mm/m$^2$·day·atm, while the oxygen permeability coefficient was 0.34 cm$^3$·mm/m$^2$·24 h·atm. Further, the obtained film was transparent, and the haze value was 0.5%. This film was maintained under predetermined conditions and evaluated for the resistance to hydrolysis, but the film did not exhibit any particular change and exhibited good resistance to hydrolysis. These results are presented in Table 1.

Example 2

The esterification reaction was carried out (7 hours) in the same manner as in Example 1, according to the predetermined method, with 100 parts by weight of glycolic acid, 24.3 parts by weight of isophthalic acid, 25 parts by weight of ethylene glycol and 0.11 parts by weight of trimethylolethane being introduced. Thereafter, 0.4 parts by weight of a germanium-based catalyst (containing 6.7% by weight of germanium dioxide) was added, and the reaction was carried out for 7.5 hours according to the predetermined method. The resulting polyester resin was evaluated in the same manner as in Example 1. The results are presented in Table 1.

Example 3

The esterification reaction was carried out (6 hours) in the same manner as in Example 1, according to the predetermined method, with 100 parts by weight of glycolic acid, 54.9 parts by weight of isophthalic acid, 52.2 parts by weight of ethylene glycol and 0.4 parts by weight of trimethylolethane being introduced. Thereafter, 0.5 parts by weight of a germanium-based catalyst (containing 6.7% by weight of germanium dioxide) was added, and the reaction was carried out for 6.3 hours according to the predetermined method. The resulting polyester resin was evaluated in the same manner as in Example 1. The results are presented in Table 1.

Example 4

The esterification reaction was carried out (6 hours) in the same manner as in Example 1, according to the predetermined method, with 100 parts by weight of glycolic acid, 12.1 parts by weight of isophthalic acid and 5.9 parts by weight of ethylene glycol being introduced. Thereafter, 0.4 parts by weight of a germanium-based catalyst (containing 6.7% by weight of germanium dioxide) was added, and the reaction was carried out for 3.5 hours according to the predetermined method.

The resulting polyester resin was evaluated in the same manner as in Example 1. The results are presented in Table 1.

Example 5

A transesterification reaction was carried out using 122.1 parts by weight of dimethyl 2,6-naphthalenedicarboxylate, 62.1 parts by weight of ethylene glycol and 0.06 parts by weight of manganese acetate at a temperature of 160° C. to 220° C., while distilling methanol out. Subsequently, an esterification reaction was carried out in the same manner as in Example 1 with 4.1 parts by weight of the product obtained from the transesterification reaction and 100 parts by weight of glycolic acid (6 hours). Thereafter, 0.38 parts by weight of a germanium-based catalyst (containing 6.7% by weight of germanium dioxide) was added, and the reaction was carried out for 7.5 hours according to the predetermined method.

The resulting polyester resin was evaluated in the same manner as in Example 1. The results are presented in Table 1.

Comparative Example 1

A solution of 100 parts by weight of glycolide (Boehringer Ingelheim Corp.) and 0.06 parts by weight of lauryl alcohol dissolved in chloroform and a solution of 0.03 parts by weight of tin chloride dissolved in chloroform were introduced into a reactor made of glass and equipped with a stirring device and a distillation pipe. After sufficiently purging the reactor with nitrogen gas, heating was carried out at ordinary pressure and at 180° C. with stirring. The system turned into solid within about one hour, thus stirring was stopped, and then heating was continued for another hour without any change. Thereafter, the system was heated to 250° C. to melt the solid, and the polymer was taken out. With regard to the polyglycolic acid resin thus obtained (Tg=43° C., Tm=223° C., number average molecular weight calculated in terms of PMMA: 100,000 [hexafluoro-2-propanol solvent]), a press film was produced in the same manner as in Example 1, except that the melting temperature was 240° C. The gas barrier property of this film was measured, and as a result, the carbon dioxide permeability coefficient was 0.1 $cm^3 \cdot mm/m^2 \cdot day \cdot atm$, while the oxygen permeability coefficient was 0.03 $cm^3 \cdot mm/m^2 \cdot 24\ h \cdot atm$. However, the haze of the obtained film was 65%, and the film was opaque. The resistance to hydrolysis of this film was evaluated according to a predetermined method, and the film collapsed to tatters even upon lifting up with hand.

Comparative Example 2

With regard to polyethylene terephthalate (IV=0.818 dl/g), a press film of was produced in the same manner as in Example 1, except that the melting temperature was 280° C. The gas barrier property of this film was measured, and as a result, the carbon dioxide permeability coefficient was 26 $cm^3 \cdot mm/m^2 \cdot day \cdot atm$, while the oxygen permeability coefficient was 5.3 $cm^3 \cdot mm/m^2 \cdot 24\ h \cdot atm$.

Example 6

In a binary trilayer film molding machine which comprises two 20 mmφ single screw extruders and is equipped with a T-die designed such that a resin extruded from one extruder is inserted between layers of another resin extruded from the other extruder, polyethylene terephthalate (vacuum dried at 70° C. for 24 hours, IV=0.818 dl/g) at a cylinder temperature of 270 to 280° C. and the polyester resin of Example 1 (vacuum dried at 50° C. for 24 hours) at a cylinder temperature of 200 to 220° C. were co-extruded at a die temperature of 260° C. and cooled with a roll set at 65° C. in order to mold a film. A binary trilayer film comprising the glycolic acid-copolymerized polyester resin in the inner layer and polyethylene terephthalate in the outer layers could be obtained. The obtained film was transparent, and the respective layers did not peel off from each other. The cross-section of the film was observed with a microscope to measure the thickness. The outer layers respectively consisted of polyethylene terephthalate with a thickness of 35 microns, and the middle layer consisted of glycolic acid-based polyester with a thickness of 35 microns. This film was attemptively subjected to simultaneous biaxial orientation using a biaxial orientation apparatus (Iwamoto Seisakusho Co., Ltd.), at a preheating temperature of 100° C. for a preheating time of 3 minutes at a drawing rate of 25 mm/sec at a draw ratio of 3×3. The drawability was good, and thus a good drawn film could be obtained. The results are presented in Table 2.

TABLE 1

|  | Example 1 | Example 2 | Example 3 | Example 4 | Example 5 | Comp. Ex. 1 | Comp. Ex. 2 |
|---|---|---|---|---|---|---|---|
| Density [$kg/m^3$] | 1426 | 1417 | 1396 | 1473 | 1492 | 1590 | 1334 |
| IV [dl/g] | 0.635 | 0.770 | 0.906 | 0.771 | 0.751 | Insoluble | 0.818 |
| Glass transition temperature [° C.] | 41.0 | 43.9 | 49.1 | 38.8 | 41.7 | (43) [*1] | 75 |
| Cold crystallization temperature [° C.] | — | — | — | — | 142.8 | — | |
| Heat of fusion [J/g] | — | — | — | — | 8.7 | 68.4 | |
| Composition [*4] [mol %] | | | | | | | |
| GA | 71.2 | 63.1 | 50.8 | 86.9 | 95.6 | 100[*2] | — |
| IA | 14.4 | 18.5 | 24.6 | 6.6 | — | — | — |
| TA | — | — | — | — | — | — | 50 |
| 2,6NDA | — | — | — | — | 2.2 | — | — |
| EG | 10.7 | 15.0 | 21.8 | 6.0 | 1.8 | — | 48.5 |
| DEG | 3.7 | 3.4 | 2.8 | 0.60 | 0.4 | — | 1.5 |
| Carbon dioxide permeability coefficient [*3] | 0.85 | 0.95 | 1.32 | 0.3 | 0.17 | 0.1 | 26 |
| Oxygen permeability coefficient [*3] | 0.34 | — | — | 0.1 | 0.05 | 0.03 | 5.3 |
| Transparency Haze (%) | 0.7 | 0.5 | 0.5 | 0.6 | 0.6 | 65 | 0.8 |
| Resistance to hydrolysis | ○ | ○ | ○ | ○ | ○ | x | ○ |
| 1349 + 0.85 * M | 1410 | 1403 | 1392 | 1423 | 1430 | 1434 | 1349 |

[*1] Glass transition temperature not clear
[*2] Assumed value since the resin did not dissolve in solvent
[*3] Unit [ml · $mm/m^2$ · day · atm]
[*4] GA: glycolic acid, IA: isophthalic acid, TA: terephthalic acid, 2,6NDA: 2,6-naphthalenedicarboxylic acid, EG: ethylene glycol, DEG: diethylene glycol

Comparative Example 3

A binary trilayer film was obtained in the same manner as in Example 6, except that the polyglycolic acid of Comparative Example 1 was used instead of the polyester of Example 1, and the cylinder temperature was set to 240° C. to 220° C. The obtained film was opaque, and the individual layers easily delaminated upon introduction of notches. Thereafter, the obtained multilayer film was attemptively subjected to biaxial orientation in the same manner as in Example 4, but the drawability was poor, while the film could not be molded into drawn film.

TABLE 2

|  | Example 6 | Comparative Example 3 |
|---|---|---|
| Polyester resin used in the middle layer | Copolymerized polyester of Example 1 | Polyglycolic acid of Comparative Example 1 |
| Adhesiveness to PET co-extruded film | Good | Poor (delamination) |
| Biaxial drawability | Good | Undrawable |

Example 7

The polyester resin (GI70, the properties presented in Table 3) obtained in Example 1 and polyethylene terephthalate (PET; Mitsui Chemicals, Inc.: J125) were preliminarily dried to remove moisture in the resins, and then were subjected to injection molding using a co-injection molding machine (Nissei ASB Machine Co., Ltd.: ASB-50T), to give a precursory molded product for container (referred to as a preform) (weight: about 32 g) in which the end of the opening had a PET monolayer structure, and the body and the bottom had trilayer structures of PET/GI70/PET. Herein, the cylinder temperatures were set at 200° C. for GI70 and at 270° C. for PET. The mold temperature of the injection mold was 10° C. The end of the opening of this laminate preform was heated to 180° C. with an infrared heater to induce crystallization.

Subsequently, using a biaxial orientation blow molding machine (Sidel SA: SBO LAB), the body of the preform which had undergone crystallization of the end of the opening was heated to 110° C. with an infrared heater, and compressed air was blown into the blow mold where the mold temperature was set at 150° C., to mold a laminate container having a volume of 500 ml. The draw ratio was about 7 (approximately 2.2 in the axial direction, and approximately 3.2 in the peripheral direction). The container molded by blow molding was closely attached to the mold for 10 seconds, and the entire body of the container was subjected to thermal setting. Thereafter, cooling air was blown into the container for 3 seconds, and the container was taken out of the mold. The properties of the obtained container are presented in Table 4.

Example 8

A container was molded in the same manner as in Example 7, except that the polyester resin obtained in Example 4 (GI90, the properties represented in Table 3) was used instead of GI70. The properties of the obtained containers are presented in Table 4.

Example 9

An esterification reaction was carried out in the same manner as in Example 1, except that 100 parts by weight of glycolic acid, 5.7 parts by weight of isophthalic acid, and 2.8 parts by weight of ethylene glycol were used. Thereafter, 0.44 parts by weight of a germanium-based catalyst (containing 6.7% by weight of germanium dioxide) was added, and a polycondensation reaction was carried out in the same manner as in Example 1 until the melt viscosity of the product increased to a certain degree. The reduced viscosity IV of the resulting polyester resin was 0.22 dl/g. Precrystallization of the obtained polyester resin pellets was further carried out at 130° C. for 2 hours under a nitrogen stream at ordinary pressure, and then solid phase polymerization was carried out at 190° C. for 48 hours. The properties of the resulting polyester resin (GI95) are presented in Table 3.

Subsequently, molding of a container was carried out in the same manner as in Example 7, except that GI95 was used instead of GI70, and the cylinder temperature of GI95 was set at 210 to 220° C. The properties of the resulting container are presented in Table 4.

Example 10

An esterification reaction was carried out in the same manner as in Example 1, except that 100 parts by weight of glycolic acid, 2.2 parts by weight of isophthalic acid and 1.1 parts by weight of ethylene glycol were used. Thereafter, 0.44 parts by weight of a germanium-based catalyst (containing 6.7% by weight of germanium dioxide) was added, and a polycondensation reaction was carried out in the same manner as in Example 1 until the melt viscosity of the product increased to a certain degree. The reduced viscosity IV of the obtained polyester resin was 0.35 dl/g. Solid phase polymerization of the obtained polyester resin pellets was further carried out in the same manner as in Example 9. The properties of the resulting polyester resin (GI98) are presented in Table 3.

Subsequently, molding of a container was carried out in the same manner as in Example 7, except that GI98 was used instead of GI70, and the cylinder temperature of GI98 was set at 210 to 220° C. The properties of the resulting container are presented in Table 4.

Example 11

An esterification reaction was carried out in the same manner as in Example 1, except that 100 parts by weight of glycolic acid and 6.8 parts by weight of bishydroxyethoxy terephthalate were used. Thereafter, 0.42 parts by weight of a germanium-based catalyst (containing 6.7% by weight of germanium dioxide) was added, and a polycondensation reaction was carried out in the same manner as in Example 1 until the melt viscosity of the product increased to a certain degree. The reduced viscosity IV of the obtained polyester resin was 0.370 dl/g. Solid phase polymerization of the obtained polyester resin pellets was further carried out in the same manner as in Example 9. The properties of the resulting polyester resin (GT96) are presented in Table 3.

Subsequently, molding of a container was carried out in the same manner as in Example 7, except that GT96 was used instead of GI170, and the cylinder temperature of GT96 was set at 210 to 220° C. The properties of the resulting container are presented in Table 4.

Example 12

Molding of a container was carried out in the same manner as in Example 7, except that the polyester resin obtained in Example 5 (GN98, the properties presented in Table 3) was used instead of GI70, and the cylinder temperature for GN98 was set at 210 to 220° C. The properties of the resulting container are presented in Table 4.

Comparative Example 4

An esterification reaction was carried out in the same manner as in Example 1, except that only 100 parts by weight of glycolic acid was used. Thereafter, 0.44 parts by weight of a germanium-based catalyst (containing 6.7% by weight of germanium dioxide) was added, and a polycondensation reaction was carried out in the same manner as in Example 1 until the melt viscosity of the product increased sufficiently. The properties of the resulting polyester resin (PGA) are presented in Table 3.

Subsequently, molding of a container was carried out in the same manner as in Example 7, except that PGA was used instead of GI170, and the cylinder temperature for PGA was set at 230° C. The properties of the resulting container are presented in Table 4.

Comparative Example 5

MXD6 Nylon (Mitsubishi Gas Chemical Company, Inc.: Reny 6007) and PET (Mitsui Chemicals, Inc.: J125) were preliminarily dried to remove moisture in the resins, and then were injection molded using a co-injection molding machine (Nissei ASB Machine Co., Ltd.: ASB-50T), to give a preform (weight: about 32 g) in which the end of the opening had a PET monolayer structure, and the body and the bottom had trilayer structures of PET/MXD6 Nylon/PET. Here, the cylinder temperatures were set at 280° C. for both MXD6 Nylon and PET. The mold temperature of the injection mold was set at 10° C. The end of the opening of this laminate preform was heated to 180° C. with an infrared heater to induce crystallization.

Subsequently, using a biaxial orientation blow molding machine (Sidel SA: SBO LAB), the body of the preform which had undergone crystallization of the end of the opening was heated to 110° C. with an infrared heater, and compressed air was blown into the blow mold where the mold temperature was set at 150° C., to mold a laminate container having a volume of 500 ml. The draw ratio was about 7 (approximately 2.2 in the axial direction, and approximately 3.2 in the peripheral direction). The container molded by blow molding was closely attached to the mold for 10 seconds, and the entire body of the container was subjected to thermal setting. Thereafter, cooling air was blown into the container for 3 seconds, and the container was taken out of the mold. The properties of the obtained container are presented in Table 4.

Comparative Example 6

An EVOH resin (Kuraray Co., Ltd.: EVAL F101B) and PET (Mitsui Chemicals, Inc.: J125) were preliminarily dried to remove moisture in the resins, and then were injection molded using a co-injection molding machine (Nissei ASB Machine Co., Ltd.: ASB-50T), to give a preform (weight: about 32 g) in which the end of the opening had a PET monolayer structure, and the body and the bottom had trilayer structures of PET/EVOH/PET. Here, the cylinder temperatures were set at 190° C. for EVOH and at 280° C. for PET. The mold temperature of the injection mold was set at 10° C. The end of the opening of this laminate preform was heated to 180° C. with an infrared heater to induce crystallization.

Subsequently, using a biaxial orientation blow molding machine (Sidel SA: SBO LAB), the body of the preform which had undergone crystallization of the end of the opening was heated to 110° C. with an infrared heater, and compressed air was blown into the blow mold where the mold temperature was set at 150° C., to mold a laminate container having a volume of 500 ml. The draw ratio was about 7 (approximately 2.2 in the axial direction, and approximately 3.2 in the peripheral direction). The container molded by blow molding was closely attached to the mold for 10 seconds, and the entire body of the container was subjected to thermal setting. Thereafter, cooling air was blown into the container for 3 seconds, and the container was taken out of the mold. The properties of the obtained container are presented in Table 4.

Comparative Example 7

PET (Mitsui Chemicals, Inc.: J125) was preliminarily dried to remove moisture in the resin, and then was injection molded using only one side of the injection unit of a co-injection molding machine (Nissei ASB Machine Co., Ltd.: ASB-50T), to give a preform (weight: about 32 g) having an end of the opening. Here, the cylinder temperatures were set at 280° C., and the mold temperature of the injection mold was set at 10° C. The end of the opening of this preform was heated to 180° C. with an infrared heater to induce crystallization.

Subsequently, using a biaxial orientation blow molding machine (Sidel SA: SBO LAB), the body of the preform which had undergone crystallization of the end of the opening was heated to 110° C. with an infrared heater, and compressed air was blown into the blow mold where the mold temperature was set at 150° C., to mold a container having a volume of 500 ml. The draw ratio was about 7 (approximately 2.2 in the axial direction, and approximately 3.2 in the peripheral direction). The container molded by blow molding was closely attached to the mold for 10 seconds, and the entire body of the container was subjected to thermal setting. Thereafter, cooling air was blown into the container for 3 seconds, and the container was taken out of the mold. The properties of the obtained container are presented in Table 4.

TABLE 3

| | Ex. 7 (GI70) | Ex. 8 (GI90) | Ex. 9 (GI95) | Ex. 10 (GI98) | Ex. 11 (GT96) | Ex. 12 (GN98) | Comp. Ex. 3 (PGA) |
|---|---|---|---|---|---|---|---|
| Density [kg/m$^3$] | 1426 | 1473 | 1497 | 1502 | 1495 | 1492 | 1590 |
| Reduced viscosity IV [dl/g] | 0.64 | 0.77 | 0.67 | 0.63 | 1.0 | 0.75 | Insoluble |
| Glass transition temperature [° C.] | 41.0 | 38.8 | 38.3 | 37.6 | 38.6 | 41.7 | (43)[*1] |

TABLE 3-continued

|  | Ex. 7 (GI70) | Ex. 8 (GI90) | Ex. 9 (GI95) | Ex. 10 (GI98) | Ex. 11 (GT96) | Ex. 12 (GN98) | Comp. Ex. 3 (PGA) |
|---|---|---|---|---|---|---|---|
| Cold crystallization temperature [°C.] | — | — | 123.6 | 106.2 | 137.8 | 142.8 | — |
| Melting point [°C.] | — | — | 195.6 | 208.0 | 186.9 | 189.6 | 222.9 |
| Heat of fusion [J/g] | — | — | 52.9 | 68.9 | 10.1 | 8.7 | 76.7 |
| Comp. [*4] |  |  |  |  |  |  |  |
| Glycolic acid [mol %] | 71.2 | 86.9 | 94.8 | 97.9 | 94.8 | 95.6 | 100[*2] |
| Aromatic dicarboxylic acid | IA | IA | IA | IA | TA | 2,6NDA | — |
| 1349 + 0.85 * M | 1410 | 1423 | 1430 | 1432 | 1430 | 1430 | 1434 |
| Carbon dioxide permeability coefficient[*3] | 0.85 | 0.3 | 0.2 | 0.15 | 0.25 | 0.17 | 0.1 |
| Oxygen permeability coefficient [*3] | 0.34 | 0.1 | 0.06 | 0.05 | 0.08 | 0.05 | 0.03 |

[*1]Glass transition temperature not clear
[*2]Assumed value since the resin did not dissolve in solvent
[*3](ml · mm/m² · day · atm)
[*4] GA: glycolic acid, IA: isophthalic acid, TA: terephthalic acid, 2,6NDA: 2,6-naphthalenedicarboxylic acid

TABLE 1

|  | Example 7 | Example 8 | Example 9 | Example 10 | Example 11 | Example 12 |
|---|---|---|---|---|---|---|
| Layer constitution Thickness (μm) | PET/GI70/PET 170/50/170 | PET/GI90/PET 170/50/170 | PET/GI95/PET 170/50/170 | PET/GI98/PET 170/50/170 | PET/GT96/PET 170/50/170 | PET/GN98/PET 170/50/170 |
| Thermal setting 150° C. × 10 sec | Present | Present | Present | Present | Present | Present |
| Oxygen permeability coefficient (ml/bottle · day · atm) | 0.013 | 0.005 | 0.003 | 0.003 | 0.004 | 0.003 |
| Transparency | Good | Good | Good | Good | Good | Good |
| Heat resistance | Good | Good | Good | Good | Good | Good |
| Interlayer adhesiveness | Good | Good | Good | Good | Good | Good |
| Recyclability of container (Haze value of sheet) | 3 | 3 | 6 | 10 | 5 | 5 |

|  | Comp. Ex. 4 | Comp. Ex. 5 | Comp. Ex. 6 | Comp. Ex. 7 |
|---|---|---|---|---|
| Layer constitution Thickness (μm) | PET/PGA/PET 170/50/170 | PET/MXD6/PET 170/50/170 | PET/EVOH/PET 170/50/170 | PET 390 |
| Thermal setting | Present | Present | Present | Present |
| Oxygen permeability coefficient (ml/bottle · day · atm) | 0.003 | 0.010 | 0.010 | 0.030 |
| Transparency | Poor | Good | Poor | Good |
| Heat resistance | Good | Good | Good | Good |
| Interlayer adhesiveness | Poor (Delamination) | Poor (Delamination) | Poor (Delamination) | — |
| Recyclability of container (Haze value of sheet) | 88 | 15 | 91 | 1 |

INDUSTRIAL APPLICABILITY

According to the present invention, provided is a polyester resin which is obtained by copolymerizing a highly concentrated oxycarboxylic acid and an aromatic dicarboxylic acid and has a density in a specific range. This resin has high gas barrier property and excellent mechanical properties, transparency, resistance to hydrolysis and the like, thus being used in various gas barrier packaging materials. Also, since the miscibility and adhesiveness with polyethylene terephthalate are excellent, the polyester resin can be suitably used as a gas barrier property modifier for polyethylene terephthalate and also a material to be laminate molded with polyethylene terephthalate. A resin composition of the polyester resin with polyethylene terephthalate or a laminate molded product of the polyester resin with polyethylene terephthalate has excellent gas barrier property and excellent mechanical properties, heat resistance and transparency, and thus can be widely used for food packaging, food containers, medical materials, industrial materials and the like in the shape of films, sheets, blow molding containers and the like. Furthermore, the polyester resin can be also recovered and recycled after use in the same manner as polyethylene terephthalate is done.

The invention claimed is:

1. A polyester resin (A) comprising
   (a-1) 45 to 99% by mole of an oxycarboxylic acid unit having 5 carbon atoms or less,
   (a-2) 0.5 to 27.5% by mole of an aromatic dicarboxylic acid unit,
   (a-3) 0.5 to 27.5% by mole of an aliphatic diol unit having 4 carbon atoms or less,
   based on 100% by mole of the total constituent units, and containing the oxycarboxylic acid unit having 5 carbon atoms or less (a-1), the aromatic dicarboxylic acid unit (a-2) and the aliphatic diol unit having 4 carbon atoms or less (a-3) in a total amount of 95% by mole or greater,
   wherein the relationship between the content of the oxycarboxylic acid unit, expressed as M % by mole, and the density of the polyester resin, expressed as ρ (kg/m$^3$), satisfies the following Formula 1:

$\rho \geq 1349 + M \times 0.85.$ [Formula 1]

2. The polyester resin (A) according to claim 1, wherein the oxycarboxylic acid unit having 5 carbon atoms or less is glycolic acid unit.

3. The polyester resin (A) according to claim 1, wherein the aromatic dicarboxylic acid unit is at least one dicarboxylic acid unit selected from isophthalic acid, 2,6-naphthalenedicarboxylic acid and terephthalic acid.

4. A molded product formed from a laminate having at least a layer comprising an oxycarboxylic acid-copolymerized polyester resin (A) and a layer comprising crystalline polyester resin (B):
   (A): the oxycarboxylic acid-copolymerized polyester resin which contains 45 to 99% by mole of an oxycarboxylic acid unit having 5 carbon atoms or less based on 100% by mole of the total constituent units, contains the oxycarboxylic acid unit having 5 carbon atoms or less, an aromatic dicarboxylic acid unit and an ethylene glycol unit in a total amount of 95% by mole or greater, and satisfies the following Formula (1):

$\rho \geq 1349 + M \times 0.85$ [Formula 1]

wherein ρ is the density (kg/m$^3$), and M is the content of the oxycarboxylic acid unit (% by mole).

5. The molded product according to claim 4, wherein the copolymerized polyester resin (A) contains 0.5 to 27.5% by mole of the aromatic dicarboxylic acid unit and 0.5 to 27.5% by mole of the ethylene glycol unit.

6. The molded product according to claim 4, wherein the crystalline polyester resin (B) is a polyester selected from the group consisting of polyethylene terephthalate, polytrimethylene terephthalate, polybutylene terephthalate, polyethylene-2,6-naphthalate and polyethylene isophthalate.

7. The molded product according to any one of claims 4 to 6, having a structure wherein the layer comprising the polyester resin (A) is interposed between the layers comprising the crystalline polyester resin (B).

* * * * *